US008909392B1

(12) United States Patent
Carrico

(10) Patent No.: US 8,909,392 B1
(45) Date of Patent: Dec. 9, 2014

(54) SYSTEM AND METHOD TO AUTOMATICALLY PRESELECT AN AIRCRAFT RADIO COMMUNICATION FREQUENCY

(75) Inventor: Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 610 days.

(21) Appl. No.: 12/822,784

(22) Filed: Jun. 24, 2010

(51) Int. Cl.
*G06F 17/00* (2006.01)
*H04W 4/00* (2009.01)

(52) U.S. Cl.
USPC ............................................. 701/3; 455/431

(58) Field of Classification Search
USPC ................... 701/3, 10, 301; 455/431
See application file for complete search history.

(56) References Cited

U.S. PATENT DOCUMENTS

| | | | |
|---|---|---|---|
| 6,167,238 A * | 12/2000 | Wright | 455/66.1 |
| 6,282,417 B1 * | 8/2001 | Ward | 455/431 |
| 6,473,675 B2 * | 10/2002 | Sample | 701/516 |
| 6,664,945 B1 | 12/2003 | Gyde | |
| 7,027,812 B2 * | 4/2006 | Dastrup et al. | 455/431 |
| 7,363,119 B2 | 4/2008 | Griffin | |
| 7,587,278 B2 * | 9/2009 | Poe et al. | 701/301 |
| 7,606,715 B1 | 10/2009 | Krenz | |
| 7,640,082 B2 | 12/2009 | Dwyer | |
| 8,149,141 B2 * | 4/2012 | Coulmeau et al. | 340/945 |
| 2003/0025719 A1 | 2/2003 | Palmer | |
| 2004/0006412 A1 * | 1/2004 | Doose et al. | 701/10 |
| 2007/0085739 A1 | 4/2007 | Udall | |
| 2008/0211692 A1 * | 9/2008 | Fetzmann et al. | 340/972 |
| 2008/0306691 A1 * | 12/2008 | Louis et al. | 701/301 |

* cited by examiner

*Primary Examiner* — Calvin Cheung
*Assistant Examiner* — Aaron L Troost
(74) *Attorney, Agent, or Firm* — Angel N. Gerdzhikov; Donna P. Suchy; Daniel M. Barbieri

(57) ABSTRACT

A system for automatically preselecting an aircraft voice radio communication frequency when operating on or near the airport surface. An extension of this invention can also be used in flight. A sensor input module receives aircraft state information and flight management system (FMS) airport identification data. An airport map database (AMDB) data receiving module receives AMDB data, including AMDB voice radio frequency data. A pre-select communication frequency processing module utilizes the aircraft state information, the FMS airport identification data and the AMDB data, for determining the next pre-select frequency. An output module provides an output signal representing the next pre-select communication frequency to a pre-select communication frequency display.

3 Claims, 5 Drawing Sheets

SYSTEM AND METHOD TO AUTOMATICALLY PRESELECT AN AIRCRAFT RADIO COMMUNICATION FREQUENCY

BACKGROUND OF THE INVENTION

1. Field of the Invention

The present invention relates generally to radio tuning and more particularly to a system for automatically preselecting an aircraft voice radio communication frequency.

2. Description of the Related Art

Communication radios on an aircraft are usually manually tuned by the flight crew. Typical radio tuning systems provide for advance manual entry of the desired frequency into a "pre-select" display or window that can then be transferred to the active tuning frequency by a transfer control. This allows the pilot to preset one (or more, if the system provides for more than one pre-select) frequencies, enabling the pre-selected frequencies to be activated when needed.

The problem with this type of system pertains to manual entry of the pre-select frequencies. The pilots must consult charts, handbooks, ATC advisories, or other sources of information to determine what the expected frequencies will be and then manually enter those frequencies into the voice communication radio frequency pre-select display. This can be time-consuming and error-prone.

Some systems exist or are under consideration to uplink voice communication radio tuning frequencies to the airplane. These systems include the Future Air Navigation System (FANS) used in Atlantic and Pacific oceanic airspace regions, and the Link2000+ data link system being implemented in European airspace. Such uplink tuning message systems can reduce errors caused by misunderstanding voice communication of the radio frequency tuning commands, but these systems do not reduce errors caused by manual entry of the tuning message into the frequency pre-select.

There are numerous patents/patent publications that have involved tuning radios. Some of these patents include automatic tuning of navigation radios for purposes of obtaining radio navigation fixes. Automatic tuning of navigation radios is well known to those skilled in aviation radio systems and these systems are not included in this patent. There are some patents that have involved communication radio tuning. These include, for example:

U.S. Pat. No. 7,363,119, issued to J. C. Griffen, III, et al., entitled "Methods and Systems for Automatically Displaying Information, Including Air Traffic Control Instructions," discloses a method that includes receiving from a source off-board an aircraft an instruction for changing a characteristic of the aircraft, and automatically displaying at least a portion of the instruction at a first display location. In response to receiving a first input signal directed by an operator onboard the aircraft, the method can further include displaying at least a target portion of the instruction at a second display location, without the instruction being manually regenerated, and without the instruction becoming part of a flight plan list. In response to receiving a second input signal directed by an operator, the method can further include displaying at least a target portion of the instruction at a third display location, again without the instruction being manually regenerated.

The Griffen patent ('119) discusses a broad range of display and control information, including communication radio tuning using data link communications. The patent describes a multi-step process wherein the pilot has to manually transfer (i.e. "load") the uplink frequency from the datalink display to the voice radio communication frequency pre-select display.

U.S. Pat. No. 6,664,945, issued to M. G. Gyde, et al., entitled "System and Method for Controlling Communication and Navigational Devices," discloses a system and method for graphically controlling a communication device and displaying its characteristics on a display within a vehicle including a microprocessor, a communication and navigation information window within a portion of the display, the window being generated by and in communication with the microprocessor, at least one radio in communication with and controlled by the microprocessor, a data input means in communication with the microprocessor and at least one communication and navigation information database in communication with the microprocessor. An aircraft operator provides input to a cursor control device and receives visual feedback via a display produced by a monitor. The display includes various graphical elements associated with each radio's characteristics. Through the use of the cursor control device, the operator may modify the radio's characteristics and/or other such indicia graphically in accordance with feedback provided by the display.

The Gyde patent ('945) discusses the display and control of navigation and communication radios. There is discussion of communication radio tuning, generally under manual control through use of a multifunction controller. The patent discusses communication radio tuning automatically via a database but does not use a frequency pre-select method.

U.S. Pat. No. 7,640,082, issued to D. B. Dwyer, entitled "System and Method for Distributively Displaying Terminal Procedure Data," (U.S. Pat. Pub. No. 20070260364) discloses a display system and method for an aircraft that selectively distributes and displays terminal procedure data. The system includes a processor and a display device. The processor is adapted to receive terminal procedure data representative of an airport terminal procedure that is normally illustrated on a terminal procedure chart and is operable, upon receipt of the terminal procedure data, to supply terminal procedure image rendering display commands. Each of the plurality of flight deck display devices is coupled to receive selected ones of the terminal procedure image rendering display commands and is operable, in response thereto, to render a terminal procedure image representative of a portion of the airport terminal procedure that is normally illustrated on the terminal procedure chart.

The Dwyer patent and publication ('082 and '364) focus mainly on the electronic display of terminal procedure data, specifically the approach and departure phases of flight. They discuss the display of various communication radio frequencies and automatic tuning of the appropriate radios, but there is no method described for actually implementing the radio tuning. They also discuss communication radio tuning, but do not discuss automatically loading the frequency pre-select.

U.S. Pat. Pub. No. 20070085739, by J. Udall, entitled "Mobile Information and Entertainment Appliance," discloses an information appliance that includes means for reading a pre-recorded media; a keyboard; a screen; means for WLAN connectivity; a GPS receiver; and speakers and a amplifier. The appliance may be used to experience media, by selecting a radio frequency; accessing a record to determine an association with the radio frequency and a web page; and, displaying the associated web page on the information appliance. The appliance may also be used to select a radio frequency, with a the GPS receiver, by determining, using the GPS receiver, the location of the listener; accessing a database to determine a plurality of radio stations available at the location; and presenting, for selection by the listener, on the information appliance, at least one of the available radio stations. The appliance can also be used to locate a WLAN access point, by determining, using a GPS receiver, the location of the listener; accessing a database to determine a plurality of WLAN access points available at the location; and presenting, for selection by the user, at least one of the WLAN access points.

The Udall patent publication ('739) describes methods for location-based broadcast radio tuning on portable consumer electronic devices. It does not address two-way communication channels, nor use of a frequency pre-select. It describes presenting a list of available radio stations in range of the user, enabling the user to manually select the desired station from the list.

SUMMARY OF THE INVENTION

In a broad aspect, the present invention is a system for automatically preselecting an aircraft voice radio communication frequency when operating on or near the airport surface. An extension of this invention can also be used in flight. A sensor input module receives aircraft state information and flight management system (FMS) airport identification data. An airport map database (AMDB) data receiving module receives AMDB data, including AMDB voice radio frequency data. A pre-select communication frequency processing module utilizes the aircraft state information, the FMS airport identification data and the AMDB data, for determining the next pre-select frequency. An output module provides an output signal representing the next pre-select communication frequency to a pre-select communication frequency display.

The pre-select communication frequency processing module operates to implement the following steps:

a) reading the received aircraft state information;

b) determining whether the aircraft is on the ground, and if so implementing the following steps:

1) reading in the received FMS airport identification data;
2) determining the airport in which the aircraft is situated using the aircraft state data and FMS airport identification data;
3) reading in the AMDB data for the airport;
4) reading in the airport voice radio frequency data from the AMDB data;
5) reading in the aircraft state data;
6) computing a current voice radio frequency using the aircraft state data and the airport voice radio frequency data to determine what voice communication frequency applies to the current aircraft location;
7) computing a next voice radio frequency using the aircraft state data and the airport voice radio frequency data to predict when the aircraft is about to enter the next voice communication frequency area;
8) outputting the next voice radio frequency; and,
9) repeating steps 5) through 8); and, c) reading the received aircraft state information if the aircraft is not on the ground.

Thus, this aircraft-centric invention uses databases, and other information sources, along with state information, including aircraft position, to automatically load voice radio tuning frequencies into the pre-select communication frequency display. The crew confirms the pre-loaded frequencies and activates those frequencies when desired.

Unlike the Griffen '119 patent, the present invention is an automatic process for transferring the uplink frequency to the frequency pre-select display and does not rely on a manually activated load mechanism.

This is particularly advantageous in that this invention reduces pilot workload, since the pilot does not have to manually enter the pre-select frequency. This invention is also advantageous in that it reduces the probability of a radio tuning error caused by manual entry of the pre-select frequency. Finally, the method of automatically loading the voice radio pre-select frequency, as opposed to directly automatically tuning the voice radio as suggested by some of the referenced patents, enables the pilot to review the frequency for correctness and allows the pilot to activate the pre-select frequency at the desired time.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
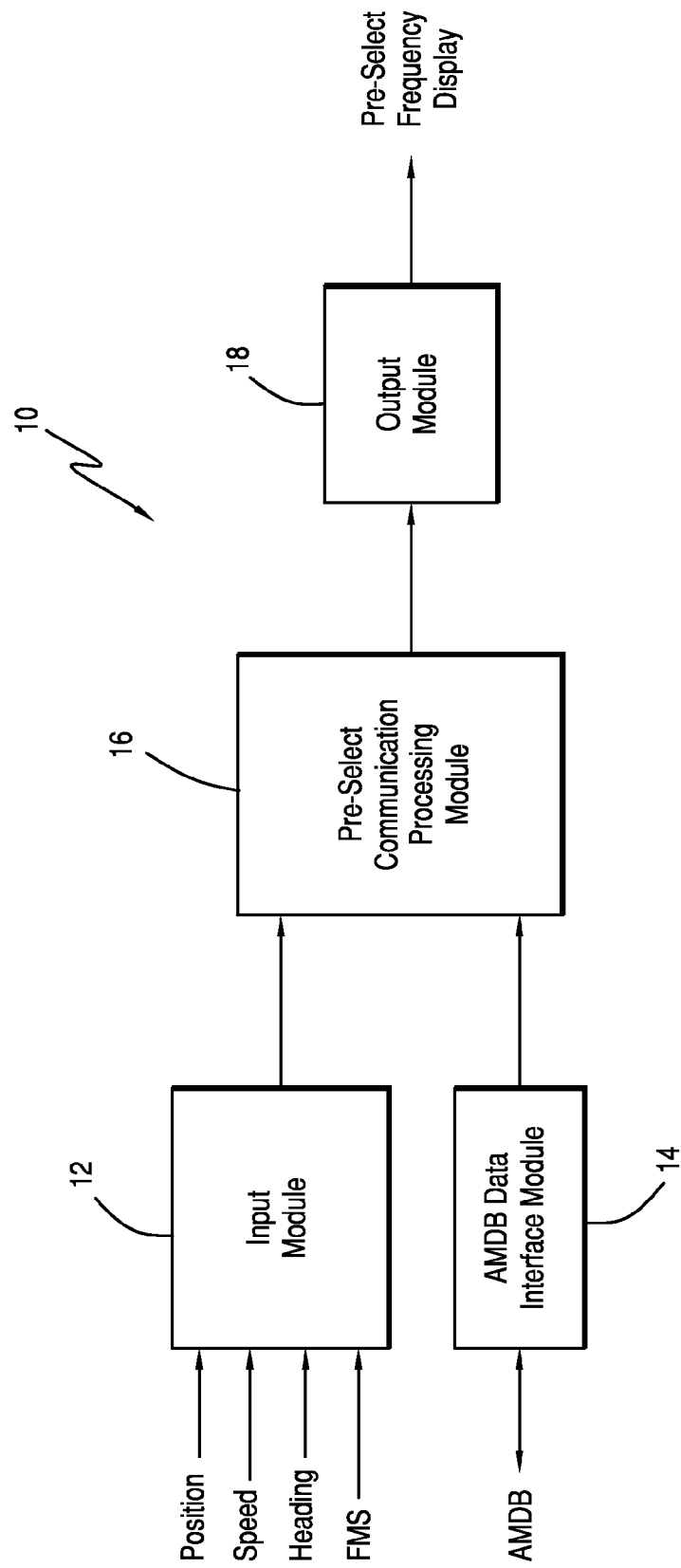
FIG. 1 is a block diagram of a first embodiment of the system for automatically preselecting an aircraft radio communication frequency, of the present invention.

Referring now to the drawings and the characters of reference marked thereon, FIG. 1 illustrates the system for automatically preselecting an aircraft voice radio communication frequency, designated generally as 10. The system 10 includes a sensor input module 12 for receiving aircraft state information and flight management system (FMS) airport identification data. The aircraft state information generally includes, for example, position, speed, heading, and altitude data. The FMS airport identification data generally includes the origin, destination, and alternate airport identifiers that are programmed into the flight plan.

An airport map database (AMDB) data receiving module 14 receives AMDB data, including AMDB voice radio frequency data. The AMDB may be, for example, such as defined by ARINC Specification 816, or more generally, a database conforming to the performance specifications contained in RTCA DO-257, and in particular, containing the air traffic control, ramp, and fixed base operator voice radio communication frequencies for an airport.

A voice radio pre-select communication frequency processing module 16 utilizes the aircraft state information and the AMDB data for determining the next voice radio pre-select frequency. An output module 18 provides an output signal representing the next voice radio pre-select communication frequency to a pre-select voice radio communication frequency display. The pre-select voice radio communication frequency display is part of the aircraft's voice radio tuning system. The processing module 16 may be a general purpose type processor such as described in RTCA DO-255, which is well known in the aviation industry, or a microprocessor such as a PowerPC microprocessor manufactured by International Business Machines Corporation. The processing module of the module 16 may also comprise associated support circuitry, such as program memory, working memory, and digital input/output interfaces, as is known in the art.

Figure 2:
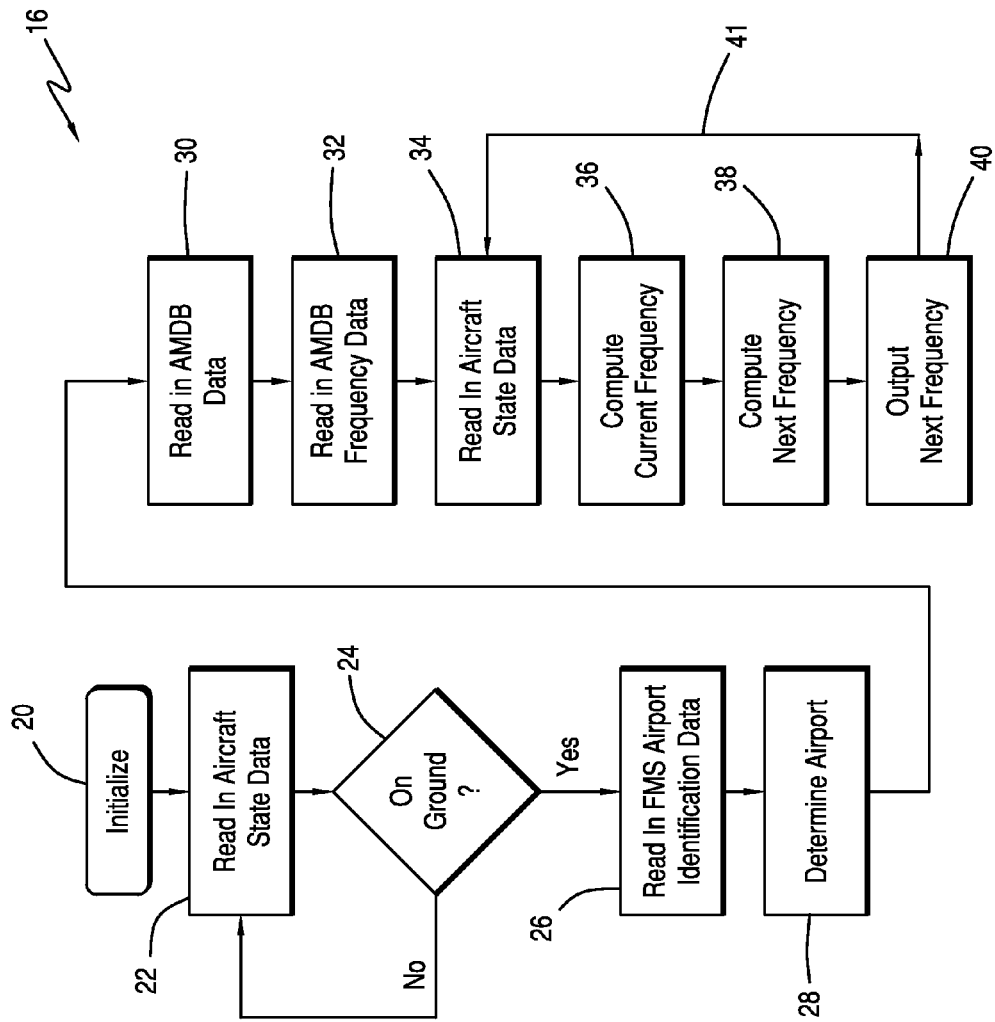
FIG. 2 is a flow diagram illustrating the implementing steps provided by the pre-select communication frequency processing module, of the system of FIG. 1.

Referring now to FIG. 2, the implementing steps provided by the voice radio pre-select communication frequency processing module are illustrated. After initialization (process block 20) in a first step, the aircraft state data is read in (process block 22). Next, a determination is made as to whether the aircraft is on the ground (decision block 24). If the aircraft is not on the ground, the process returns to the previous step (process block 22) of reading in the aircraft state data. If the aircraft is on the ground, the processor 16 implements the following steps:

1) reading in the received FMS airport identification data (process block 26);
2) determining the airport in which the aircraft is situated using the aircraft state data and the FMS airport identification data (process block 28);
3) reading in the AMDB data for the airport (process block 30);
4) reading in airport voice radio frequency data from the AMDB data (process block 32);
5) reading in the aircraft state data (process block 34);
6) computing a current voice radio frequency using the aircraft state data and the airport voice radio frequency data to determine what voice communication frequency applies to the current aircraft location (process block 36);
7) computing a next voice radio frequency using said aircraft state data and said airport voice radio frequency data to predict when the aircraft is about to enter the next voice communication frequency area (process block 38);
8) outputting the next voice radio frequency (process block 40); and,
9) repeating steps 5) through 8) (indicated by designation 41).

Figure 3:
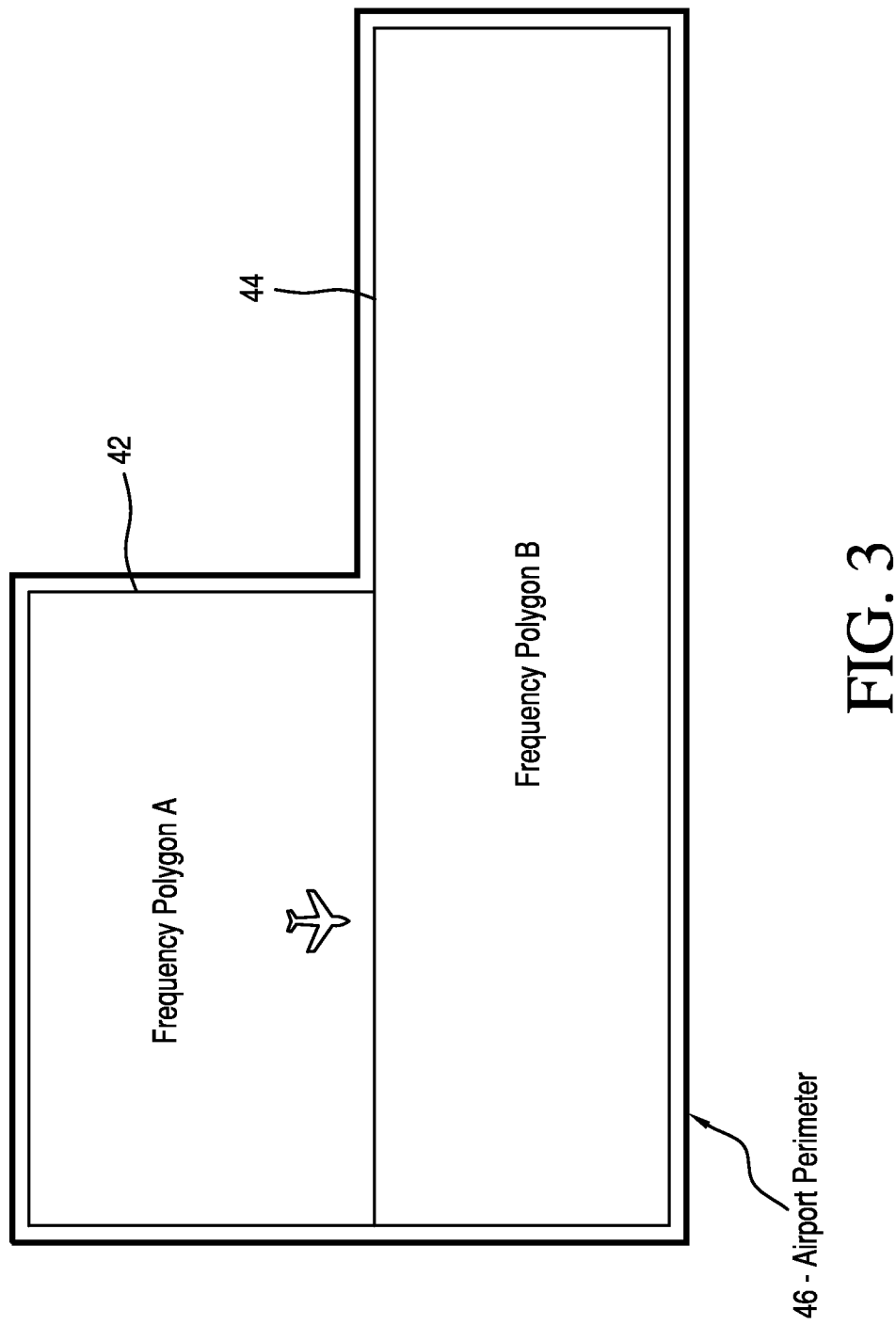
FIG. 3 is a schematic illustration of the designated areas on an airport surface that have a specific Air Traffic Control voice communication frequency assigned to that area.

Referring now to FIG. 3, the designated areas 42, 44 (i.e. Frequency Polygon A and Frequency Polygon B) on an airport surface 46 that have a specific voice radio communication frequency assigned to that area, is schematically illustrated. In this illustration, the aircraft is currently in frequency polygon A (designated area 42). The frequency assigned to frequency polygon A is thus the current voice radio frequency (as determined in FIG. 2, process block 36). Based on the aircraft state information, in this case particularly the aircraft heading and speed information, the aircraft is predicted to enter frequency polygon B (designated area 44). Thus, the frequency assigned to frequency polygon B is the next voice communication radio frequency (as computed by FIG. 2, process block 38). Additional aircraft state information, if available, such as taxi route information, may be used to predict when the aircraft is about to enter a new frequency polygon.

Although the FIG. 1-3 system is useful for surface applications, a means to automatically update the voice radio frequency pre-select display in-flight would be useful. Some current and planned systems use a text-message based data link system to transmit radio tuning frequencies to the to the flight crew (via FANS 1/A or Link 2000+, for example). The inventive concept illustrated above can be expanded to facilitate the transfer of the datalinked frequency message to the tuning pre-select via adding an appropriate user interaction to the datalink HMI.

Figure 4:
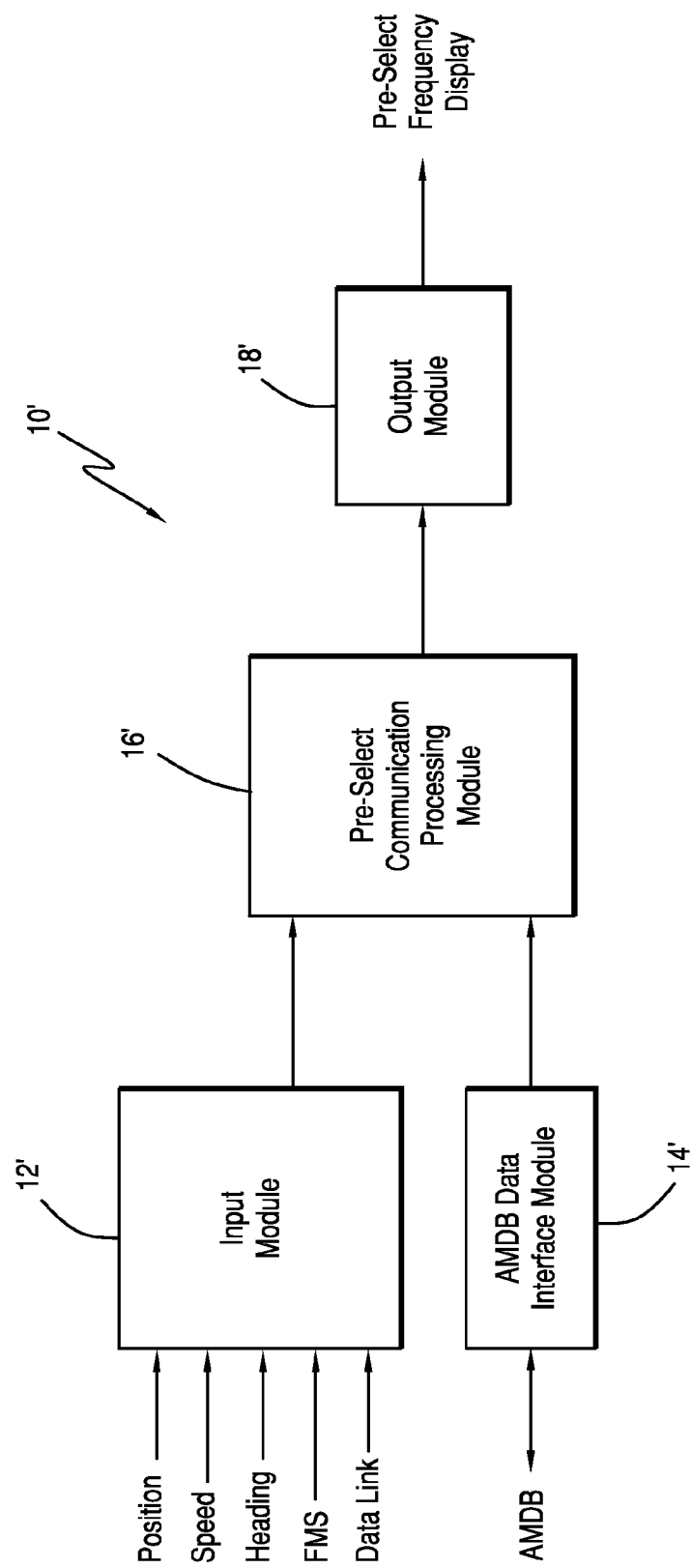
FIG. 4 is a block diagram of an alternate embodiment of the system for automatically preselecting an aircraft voice radio communication frequency, which can be utilized on the ground or in the air.

Referring now to FIG. 4, an alternate embodiment of the system for automatically preselecting an aircraft voice radio communication frequency is illustrated, designated generally as 10'. System 10' involves an automatic transfer of an uplink voice radio frequency command to the voice radio communication frequency pre-select display. The system shown in FIG. 4 can be utilized on the ground or in the air.

Figure 5:
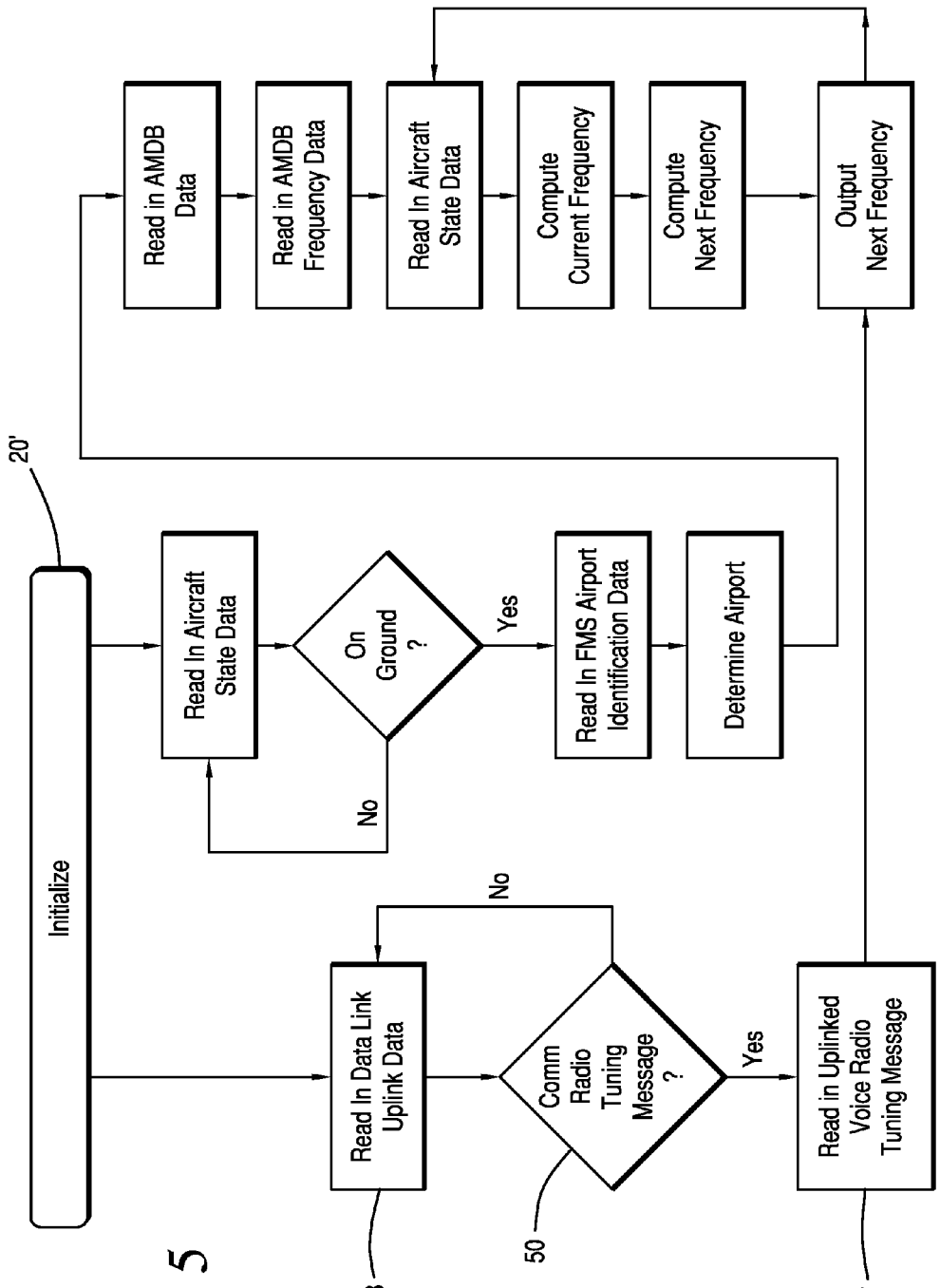
FIG. 5 illustrates the implementing steps provided by the pre-select voice radio communication frequency processing module, of the system of FIG. 4.

In this embodiment, the sensor input module 12', in addition to receiving the inputs discussed above relative to the first embodiment, also receives a data link uplink communication radio tuning message. As can be seen in FIG. 5, the pre-select communication frequency processing module 16' further operates to implement the steps of:

1) reading in the received data link uplink message (processing block 48);
2) determining if the received data link uplink message includes a voice radio tuning message (process block 50);
3) reading in the uplinked voice radio tuning message (process block 52); and,
4) transferring the uplinked voice radio tuning message to the output module.

Other embodiments and configurations may be devised without departing from the spirit of the invention and the scope of the appended claims.

The invention claimed is:

1. A system for automatically preselecting an aircraft voice radio communication frequency, comprising:
   a) a sensor input module configured to receive aircraft state information and flight management system (FMS) airport identification data, said aircraft state information comprising position, speed, and heading information;
   b) an airport map database (AMDB) data receiving module configured to receive AMDB data, including AMDB voice radio frequency data, said AMDB data defined by ARINC 816;
   c) a pre-select communication frequency processing module configured to utilize said aircraft state information, said FMS airport identification data and said AMDB data, for determining a next pre-select frequency; and,
   d) an output module for providing an output signal representing said next pre-select voice radio communication frequency to a next voice radio pre-select frequency display,
   wherein said pre-select communication frequency processing module is configured to:
   read said received aircraft state information;
   determine that the aircraft is on the ground, and based on said determination that the aircraft is on the ground:
   1) read in said received FMS airport identification data including an airport identifier;
   2) determine the airport in which the aircraft is situated using said aircraft state information and said FMS airport identification data;
   3) read in said AMDB data for said airport;
   4) read in airport voice radio frequency data from the AMDB data;
   5) read in said aircraft state information;
   6) compute a current voice radio frequency using the aircraft state information and the airport voice radio frequency data to determine what voice communication frequency applies to the current aircraft location;
   7) compute a next voice radio frequency using said aircraft state information and said airport voice radio frequency data to predict when the aircraft is about to enter the next voice communication frequency area;

8) output said next voice radio frequency; and,
9) repeat steps 5) through 8); and,
wherein:
said sensor input module further receives a data link uplink message; and,
said pre-select communication frequency processing module is configured to:
1) read in said received data link uplink message;
2) determine if said received data link uplink message includes a voice radio tuning message;
3) read in the uplinked voice radio tuning message; and,
4) transfer the uplinked voice radio tuning message to said output module.

2. A method for automatically preselecting an aircraft voice radio communication frequency, comprising the steps of:
a) receiving aircraft state information and flight management system (FMS) airport identification data utilizing a sensor input module, said aircraft state information comprising position, speed, and heading information;
b) receiving AMDB data, including AMDB voice radio frequency data utilizing an airport map database (AMDB) data receiving module, said AMDB data defined by ARINC 816;
c) determining the next pre-select frequency utilizing a pre-select communication frequency processing module utilizing said aircraft state information,
d) providing an output signal representing said next pre-select communication frequency to a next pre-select communication frequency display utilizing an output module
wherein said pre-select communication frequency processing module is configured to:
read said received aircraft state information;
determine that the aircraft is on the ground, and based on said determination that the aircraft is on the ground, implement the following steps:
1) reading in said received FMS airport identification data including an airport identifier;
2) determining the airport in which the aircraft is situated using said aircraft state information and said FMS airport identification data;
3) reading in said AMDB data for said airport;
4) reading in airport voice radio frequency data from the AMDB data;
5) reading in said aircraft state information;
6) computing a current voice radio frequency using the aircraft state information and the airport voice radio frequency data to determine what voice communication frequency applies to the current aircraft location;
7) computing a next voice radio frequency using said aircraft state information and said airport voice radio frequency data to predict when the aircraft is about to enter the next voice communication frequency area;
8) outputting said next voice radio frequency; and,
9) repeating steps 5) through 8); and,
wherein:
said sensor input module further receives a data link uplink message; and,
said pre-select communication frequency processing module further operates to implement the steps, comprising:
1) reading in said received data link uplink message;
2) determining if said received data link uplink message includes a voice radio tuning message;
3) reading in the uplinked voice radio tuning message; and,
4) transferring the uplinked voice radio tuning message to said output module.

3. A system for automatically preselecting an aircraft radio communication frequency, comprising:
a) a flight management system (FMS) for providing FMS airport identification data;
b) a plurality of aircraft state information sources for providing aircraft state information, said aircraft state information comprising position, speed, and heading information;
c) a sensor input module configured to receive aircraft state information and flight management system (FMS) airport identification data;
d) an airport map database (AMDB) data receiving module configured to receive AMDB data, including AMDB voice radio frequency data, said AMDB data defined by ARINC 816;
e) a pre-select communication frequency processing module configured to utilize said aircraft state information, said FMS airport identification data and said AMDB data, for determining a next pre-select frequency;
f) an output module for providing an output signal representing said next pre-select communication frequency; and,
g) a next pre-select communication frequency display configured to receive said output signal to said output module
wherein said pre-select communication frequency processing module is configured to:
read said received aircraft state information;
determine that the aircraft is on the ground, and based on said determination that the aircraft is on the ground:
1) read in said received FMS airport identification data including an airport identifier;
2) determine the airport in which the aircraft is situated using said aircraft state information and said FMS airport identification data;
3) read in said AMDB data for said airport;
4) read in airport voice radio frequency data from the AMDB data;
5) read in said aircraft state information;
6) compute a current voice radio frequency using the aircraft state information and the airport voice radio frequency data to determine what voice communication frequency applies to the current aircraft location;
7) compute a next voice radio frequency using said aircraft state information and said airport voice radio frequency data to predict when the aircraft is about to enter the next voice communication frequency area;
8) outputting output said next voice radio frequency; and,
9) repeat steps 5) through 8); and,
wherein:
said sensor input module further receives a data link uplink message; and,
said pre-select communication frequency processing module is configured to:
1) read in said received data link uplink message;
2) determine if said received data link uplink message includes a voice radio tuning message;

3) read in the uplinked voice radio tuning message; and,
4) transfer the uplinked voice radio tuning message to said output module.

\* \* \* \* \*